US008665107B2

(12) United States Patent
Caveney et al.

(10) Patent No.: US 8,665,107 B2
(45) Date of Patent: *Mar. 4, 2014

(54) PHYSICAL LAYER MANAGEMENT USING RFID AND NEAR-FIELD COUPLING TECHNIQUES

(71) Applicant: Panduit Corp., Tinley Park, IL (US)

(72) Inventors: Jack E. Caveney, North Palm Beach, FL (US); Ronald A. Nordin, Naperville, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/864,001

(22) Filed: Apr. 16, 2013

(65) Prior Publication Data

US 2013/0260603 A1    Oct. 3, 2013

Related U.S. Application Data

(63) Continuation of application No. 12/911,796, filed on Oct. 26, 2010, now Pat. No. 8,427,335.

(60) Provisional application No. 61/254,800, filed on Oct. 26, 2009.

(51) Int. Cl.
*G08B 21/00* (2006.01)

(52) U.S. Cl.
USPC .......................................... 340/687; 439/490

(58) Field of Classification Search
USPC .................... 340/687, 572.7, 572.8; 379/438; 439/488, 489, 490, 491
See application file for complete search history.

(56) References Cited

U.S. PATENT DOCUMENTS

| | | | |
|---|---|---|---|
| 6,784,802 B1 | 8/2004 | Stanescu | |
| 7,605,707 B2 | 10/2009 | German et al. | |
| 8,116,434 B2 | 2/2012 | German et al. | |
| 8,427,335 B2 * | 4/2013 | Caveney et al. | 340/687 |
| 2008/0122579 A1 | 5/2008 | German et al. | |
| 2009/0096581 A1 | 4/2009 | Macauley et al. | |
| 2010/0271182 A1 | 10/2010 | Yashukova | |
| 2011/0008996 A1 | 1/2011 | Pinn et al. | |

FOREIGN PATENT DOCUMENTS

WO    2006063023 A1    6/2006

* cited by examiner

*Primary Examiner* — John A Tweel, Jr.
(74) *Attorney, Agent, or Firm* — Christopher S. Clancy; Christopher K. Marlow

(57) ABSTRACT

An intelligent network physical layer management system is provided that includes hardware that tracks the connection of plugs of patch cords in interconnect or cross-connect patching environments. RFID signaling is combined with near-field communication techniques to provide a reliable physical layer management system. In interconnect configurations, RFID tags are associated with switch ports of an Ethernet switch, enabling the system of the present invention to detect patch cord insertion and removal at switch ports and to receive information about the switch ports. In cross-connect configurations, RFID signaling is used to track the connections of patch cords between two patch panels. Systems according to the present invention avoid the problems associated with traditional galvanic connections previously used for tracking patch cord connections. An alternative common-mode system is also described.

5 Claims, 8 Drawing Sheets

(i)

(ii)

Series LC Circuit Resonant Frequencies

$\omega_{01} = 1/\text{SQRT}(L_1 C_1) = 1/\text{SQRT}(500p*5u)$
$\quad = 20M \text{ r/s}$
$f_{01} = 3.18 \text{ MHz}$ $\omega_{02} = 1/\text{SQRT}(L_2 C_2) = 1/\text{SQRT}(20n*200u)$
$\quad = 500k \text{ r/s}$
$f_{02} = 79.6 \text{ kHz}$

PHYSICAL LAYER MANAGEMENT USING RFID AND NEAR-FIELD COUPLING TECHNIQUES

CROSS-REFERENCE TO RELATED APPLICATIONS

This application is a continuation of U.S. patent application Ser. No. 12/911,796, filed Oct. 26, 2010, which claims priority to U.S. Provisional Application No. 61/254,800, filed Oct. 26, 2009, the subject matter of which is hereby incorporated by reference in its entirety.

TECHNICAL FIELD

The present application relates to network physical layer management systems, and more particularly to a physical layer management system incorporating radio frequency identification (RFID) modules using near-field coupling techniques.

BACKGROUND

Physical layer management (PLM) systems are of growing interest in the communications industry today due to the growing size and complexity of data centers and enterprise networks. A PLM system provides automatic documentation of the physical layer (for example, a system comprising the patch field and the horizontal cabling) and assists in providing patch cord guidance for moves, adds and changes (MAC's) to the patch connections within a network. The present invention offers a radio frequency identification (RFID) technique that can improve the physical layer management system. RFID technology can be used to eliminate the galvanic connection between the plug ends of a patch cord and the patch panel(s), as found in prior PLM systems, as well as to provide Ethernet switch connectivity information that reduces the need for additional special hardware on the patch panel, such as non-uniform, specialized ports for acquiring connectivity information.

DETAILED DESCRIPTION

It is advantageous in the development of physical layer management equipment, to make the components that comprise the system to be as simple and unobtrusive as possible for the user. If the user is required to adopt new and complicated procedures to perform simple tasks such as patch cord moves, additions, or changes, the probability of success of the physical layer management system is decreased. RFID technology offers to reduce the complexity of MAC procedures as well as increase the reliability of the system by removing galvanic connections required by some PLM systems.

Figure 1:
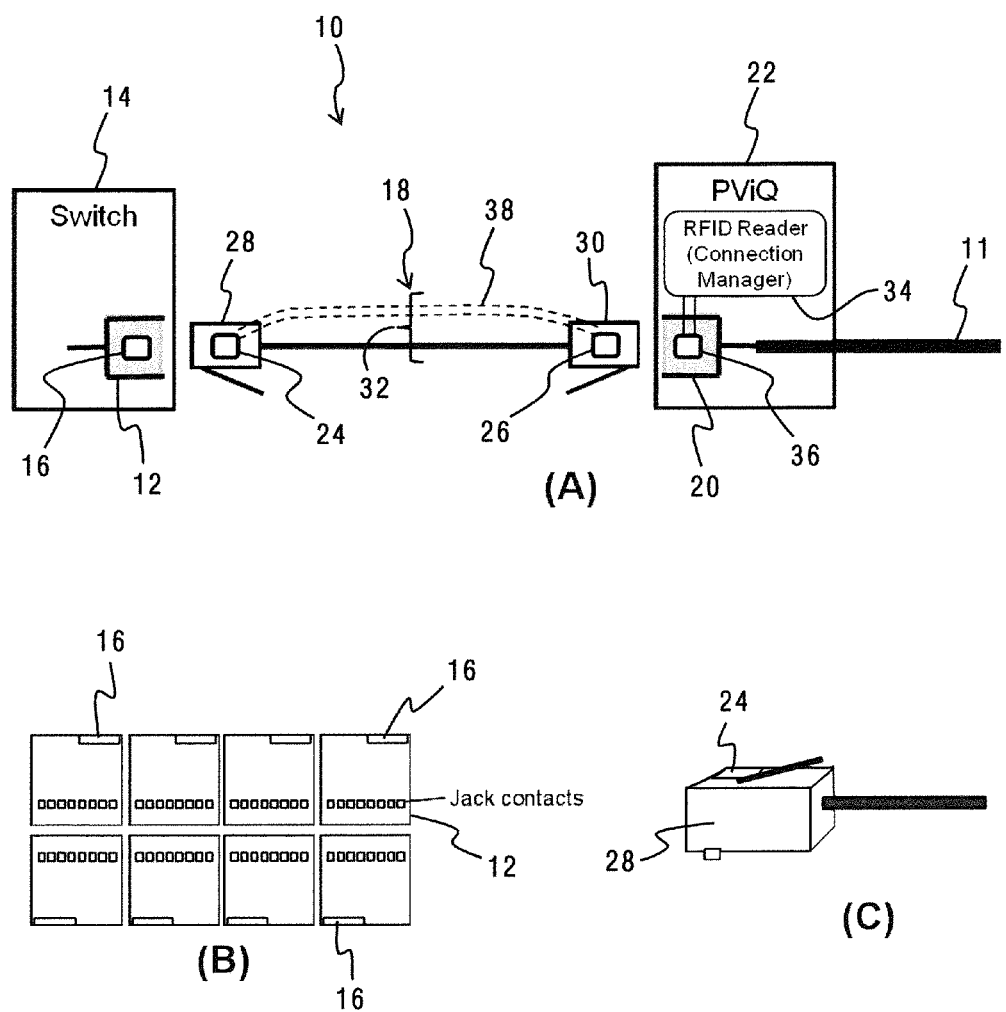
FIG. 1 shows views of a physical layer management system for use in an interconnect configuration according to one embodiment of the present invention.
Figure 2:
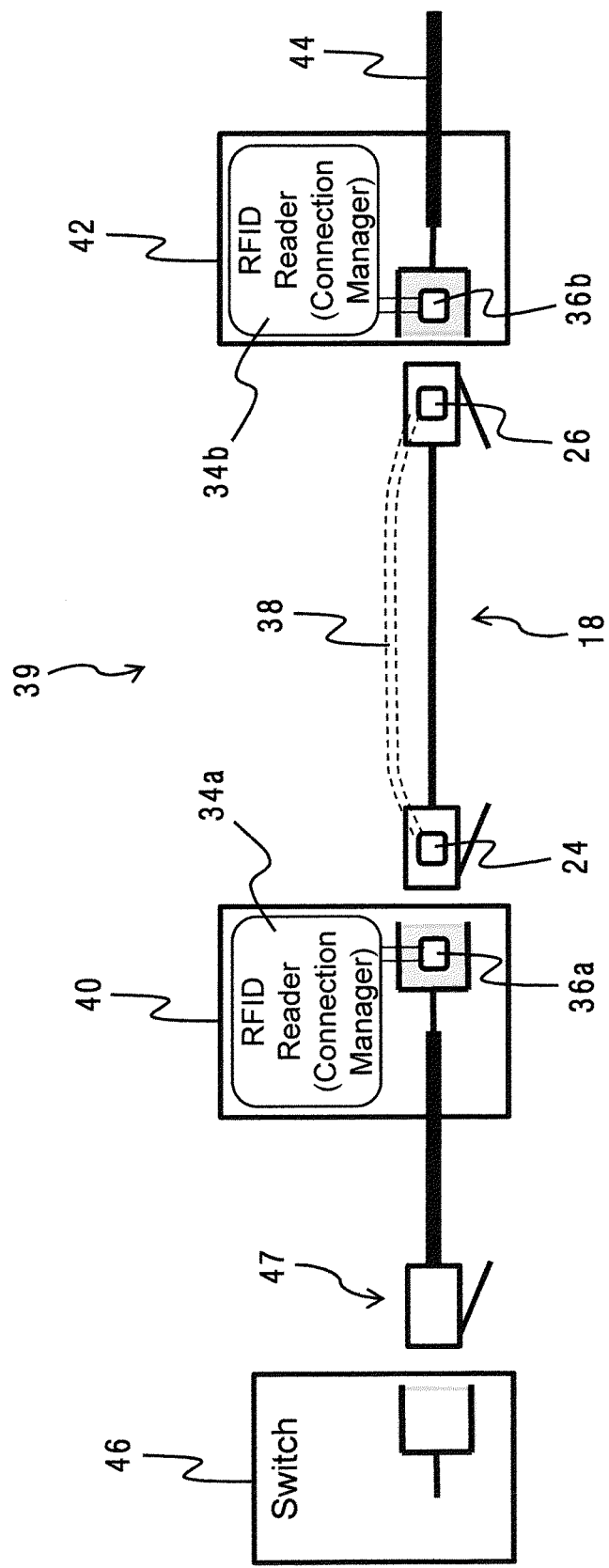
FIG. 2 is a block diagram showing an embodiment of the present invention for use in a cross-connect deployment.

Patch cord MAC procedures are generally performed within an area of the network, termed the patch field, which includes at least one patch panel. In general, there are two approaches to integrating patch panels into a network: interconnect and cross-connect. In an interconnect configuration, as shown in FIG. 1, a single patch panel is generally placed between the horizontal cabling of the network and another network element, such as a switch. In an interconnect configuration, the patch field is between the patch panel and the switch. A cross-connect configuration, in contrast, as shown in FIG. 2, uses two patch panels between the horizontal cabling and the switch. The patch field in a cross-connect configuration is located between the two patch panels. It is advantageous to design a PLM system that can be adapted for use in interconnect or cross-connect configurations.

View (A) of FIG. 1 shows the patch field portion of the physical layer management system 10 in an interconnect configuration, in which a patch panel 22 is located between horizontal cabling 11 and an Ethernet switch 14. An RJ45 jack 12 within the Ethernet switch 14 (or equivalent managed equipment) is provided with an RFID tag 16, includes an RFID ID chip and an antenna, embedded in it that can be read via an RFID reader system. A patch cord 18, which is to provide a connection between the jack 12 in the switch and a jack 20 in the patch panel 22, has antennas 24 and 26 provided in the plugs 28 and 30 on both ends of a cord 32. The patch cord 18 allows communication between the RFID tag 16 in the Ethernet switch 14 and a reader 34 in the patch panel 22. The RFID reader 34 communicates with the antenna 26 via an antenna 36 provided in a jack of the patch panel to which the patch cord 18 is connected.

The two antennas 24 and 26 in the patch cord 18 are connected to each other via a $5^{th}$ wire pair 38 within the cord 32. Utilizing a $5^{th}$ wire pair is termed an "out of band" communication technique, because it does not employ any of the "in-band" wire pairs commonly used for Ethernet signaling. In this manner the RFID reader 34 in the patch panel 22 can communicate with the RFID tag 16 embedded in the jacks 12 in Ethernet switch ports. Utilizing the $5^{th}$ wire-pair 38 for communication of PLM information ensures the performance integrity of the remaining 4 wire pairs comprising the Ethernet signal in a copper network. This 5 wire-pair cable configuration strategy will work with unshielded twisted pair (UTP) and shielded twisted pair (STP) cabling systems.

Preferably, the antennas employed in this scheme do not communicate by the use of electromagnetic waves but rather communicate to the receive antennas using a type of near-field coupling communication.

The type of information that the RFID tag 16 associated with each switch port may contain includes: RFID number, switch port number, switch number, switch type, rack number, physical location description, provisioning time (which reflects the time that a patch connection between the patch panel and the switch port was completed), etc. When the patch panel 22 communicates with the RFID tags 16 provided in the Ethernet ports to which ports of the patch panel are connected, the panel will have the necessary information to completely document the patch field. Information regarding the patch field can then be transmitted via a management connection to a network management system.

In order to support high density switch equipment (e.g., 48-port 1-rack-unit switches), the RFID tags should be mounted in such a way as to minimize crosstalk between neighboring RJ45 jacks 12 both horizontally and vertically. Proposed tag locations on the jacks and plugs are shown, respectively, in views (B) and (C) of FIG. 1. While embodiments of the present invention are shown with RFID tags 16 provided within Ethernet ports, the RFID tags associated with Ethernet ports may alternatively be provided outside of the ports, for example on a faceplate of the Ethernet switch 14.

FIG. 2 shows a plan view of a PLM system 39 according to the present invention for use in a cross-connect configuration. In this configuration, two patch panels 40 and 42 are provided between the horizontal cabling 44 and an Ethernet switch 46, with the patch field being located between the two patch panels 40 and 42. Ethernet cables 47 connect the Ethernet switch to the patch panel 40. In FIG. 2, as in FIG. 1, only one link from the Ethernet switch 46 to the horizontal cabling 44 is shown, although it is to be understood that systems according to the present invention are applied to network environments having multiple links between pieces of network hardware. In this embodiment, RFID readers 34a and 34b provided in the patch panels 40 and 42 communicate with one another and resolve the physical connectivity of the patch cords 18 connected between ports of the patch panels 40 and 42. Antennas 36a and 36b associated with the ports of the patch panels 40 and 42 communicate with one another via fifth wire pairs 38 provided in the patch cords 18. The antennas 36a and 36b respectively communicate via signaling transmitted to and from antennas 24 and 26 in the plugs of the patch cord 18.

Figure 3A:
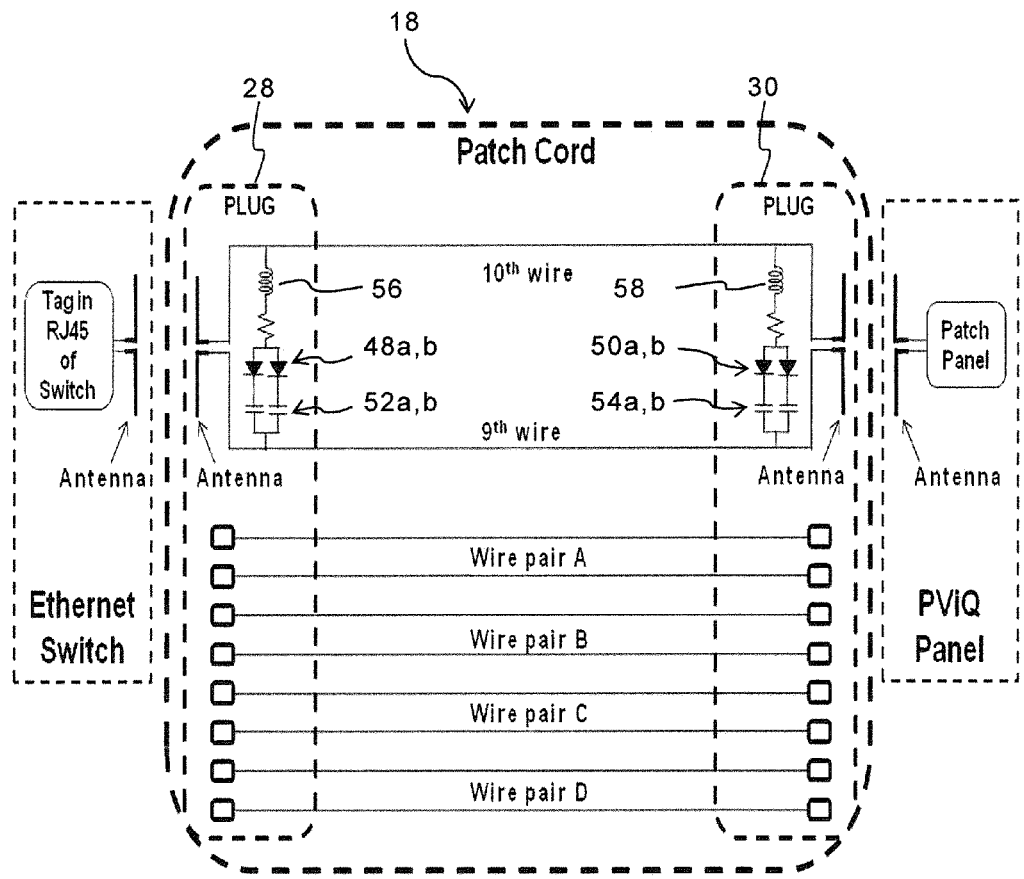
FIG. 3a is a schematic diagram of a patch cord connection according to one embodiment of the present invention.
Figure 3A:
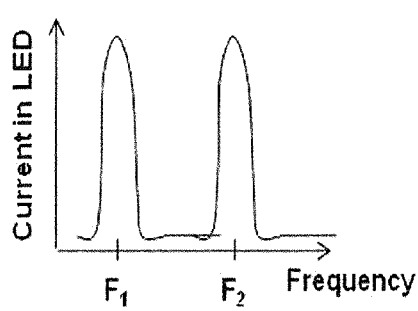
Figure 3A:
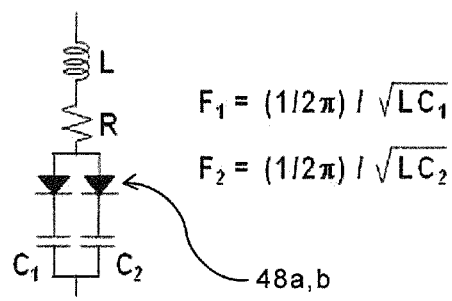

View (i) of FIG. 3a is a schematic view showing in more detail the components of the patch cord 18. It is preferable to incorporate light-emitting diodes (LEDs) into the plugs of the patch cord, to facilitate MACs. In the embodiment of FIG. 3a(i), LEDs 48a,b and 50a,b are provided within the plugs 28 and 30 of the patch cord 18. Preferably, the LEDs 48a and 50a are red and the LEDs 48b and 50b are green. The LEDs can be illuminated individually or simultaneously, when a communication signal placed on the ninth and tenth wires operates at the resonant frequency associated with each LED. In one embodiment, both plugs' LEDs on each end of the patch cord will illuminate in response to a particular signal, because the LEDs are effectively in parallel. In this embodiment, the patch cord is symmetrical.

Figure 6:
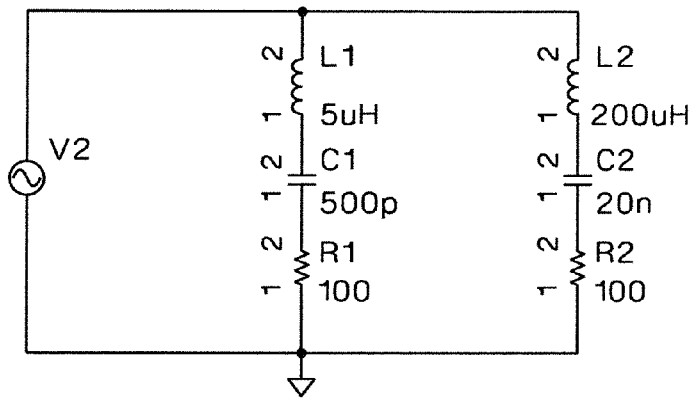
FIG. 6 shows the result of a frequency domain simulation of two series resonant LC circuits for controlling LEDs.
Figure 6:
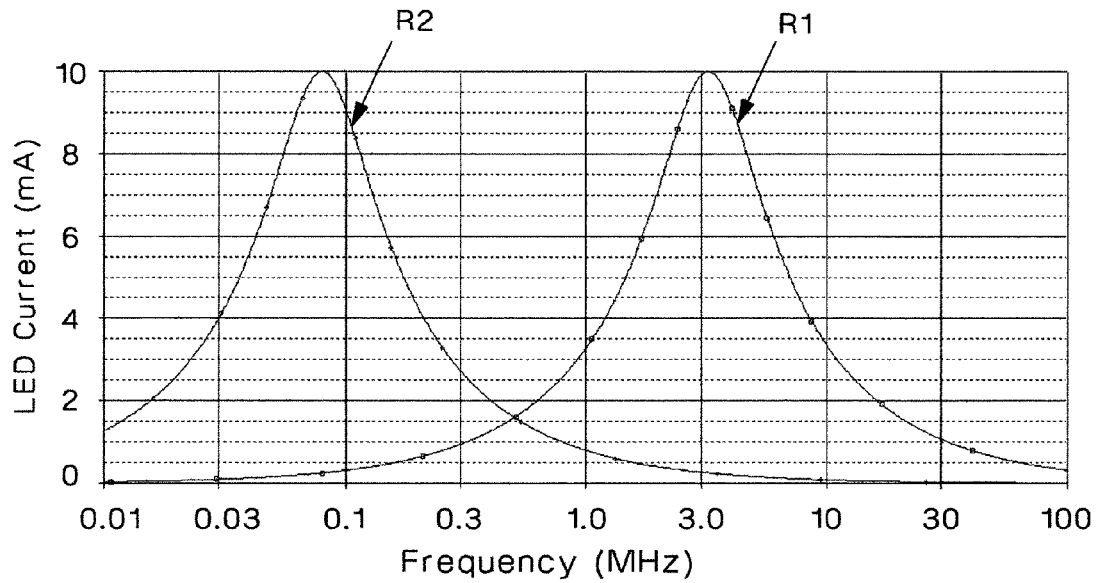

The two sets of LEDs 48a,b and 50a,b can be made to operate independently by providing multiple resonant frequencies for the LEDs to operate under. For example, the LEDs 48a,b in a first plug 28 of the patch cord 18 can illuminate at frequencies $F_1$ and $F_2$, and the LEDs 50a,b in the second plug 30 of the patch cord 18 can illuminate at frequencies $F_3$ and $F_4$, and hence the four independent frequencies can be used to control the illumination of the LEDs independently or in groups. Setting different resonant frequencies for the LEDs to respond to can be achieved by changing the values of capacitors 52a,b and 54a,b and/or inductors 56 and 58. Reasonable LED frequencies include such values as 80 kHz and 3 MHz (as shown in FIG. 6) while the RFID frequency of 900 MHz allows the adoption of standard components. FIG. 3a(ii) shows the assignment of different signaling frequencies to the two LEDs 48a,b.

The embodiment of FIG. 3a, though described in connection with a copper communication network, can be adapted for use in fiber networks.

Figures 3B, 3C:
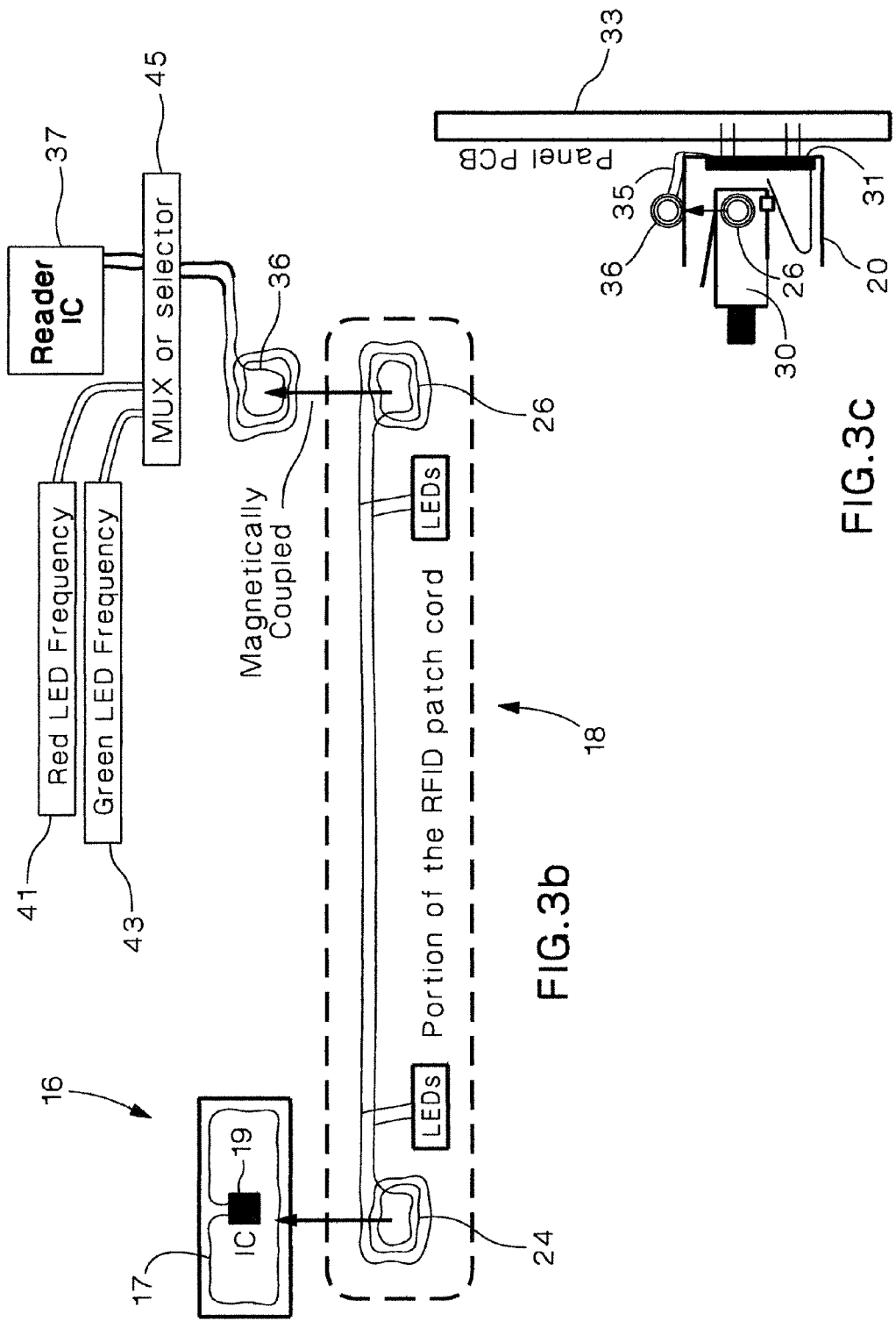
FIG. 3b is a block diagram showing connection tracking hardware according to one embodiment of the invention.
FIG. 3c is a side view of patch panel and plug hardware according to one embodiment of the present invention.

FIG. 3b is a block diagram that shows in more detail the hardware used to track patch cords according to one embodiment of the present invention. The patch cord 18 is shown in a simplified view that does not point out the plugs. The antennas 24 and 26 are shown as coil antennas. On the patch panel side of the patch cord 18, the antenna 26 magnetically couples to the antenna 36 associated with the patch panel port to which the patch cord is connected. Hardware within the patch panel, which comprises the RFID reader 34 as shown in FIG. 1(A), includes a reader integrated circuit (IC) 37, and signal generators 41 and 43 that generate frequencies associated with, for example, red and green LEDs in plugs of the patch cord 18. The reader IC 37 and the signal generators 41 and 43 are connected to a multiplexor or selector 45, which provides the required signal to the antenna 36. The signal then is transmitted down the length of the patch cord 18 to the antenna 24. The signal is coupled from the antenna 24 to the RFID tag 16 associated with the switch port into which the patch cord 18 is plugged. The RFID tag 16 includes an antenna 17 and an RFID IC 19. The antenna 17, which is magnetically coupled to the antenna 24, transfers information from the RFID IC 19 to the antenna 24. The information signal then travels the length of the patch cord 18, through the antennas 26 and 36, to the reader IC 37. At that point, the reader IC 37 has received the necessary information about the connection between the patch panel port and the switch port.

RFID readers for use in patch panels according to some embodiments of the present invention may be RFID readers known in the industry and manufactured by companies such as Texas Instruments and Philips. RFID tags for use with embodiments of the present invention, for example in switch ports, include RFID tags known in the industry and manufactured by companies such as Impinj, Invengo, and Biode. RFID readers for use in embodiments of the present invention may operate at a number of different frequencies (for example, 900 MHz, 13 MHz, 125 kHz, or other RFID frequencies).

FIG. 3c shows additional details of communications hardware used in one embodiment of the present invention. A jack 20 of the patch panel accepts a plug 30 of the patch cord 18. The antenna 26 of the plug 30 is shown as a coil antenna, as is the antenna 36 associated with the jack 20. The antenna 36 is connected via an antenna connection 35 to a printed circuit board 33 of the patch panel. This connection may be made independently, or it may be made via a printed circuit board 31 associated with the jack 20. The RFID reader IC 37 shown in FIG. 3b is preferably located on the patch panel PCB 33. The antennas shown in FIG. 3c are angled in the drawing for visibility. In a preferred embodiment they will oppose one another along a common centerline.

Figure 4:
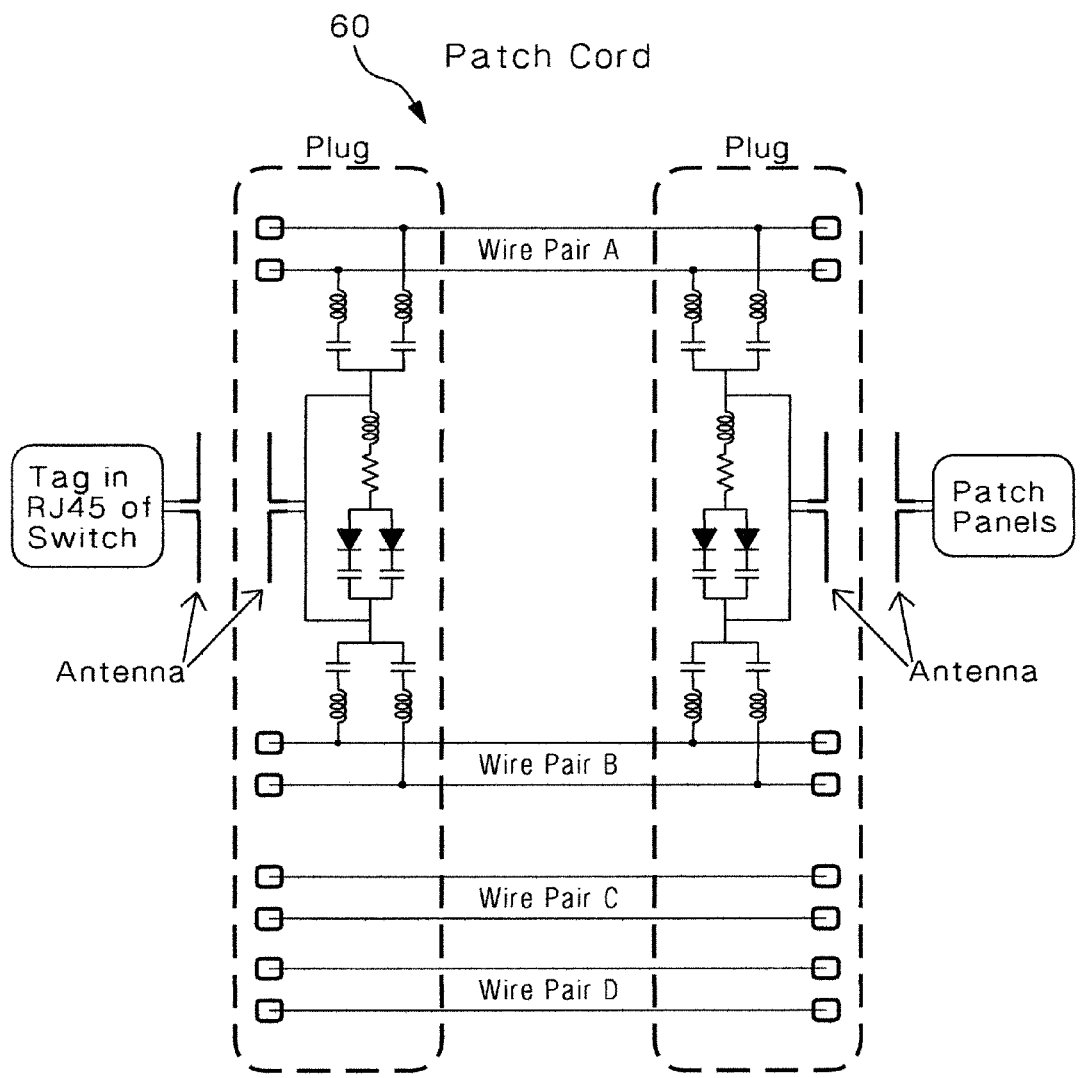
FIG. 4 is a schematic diagram of a patch cord according to one embodiment of the invention.
Figure 5:
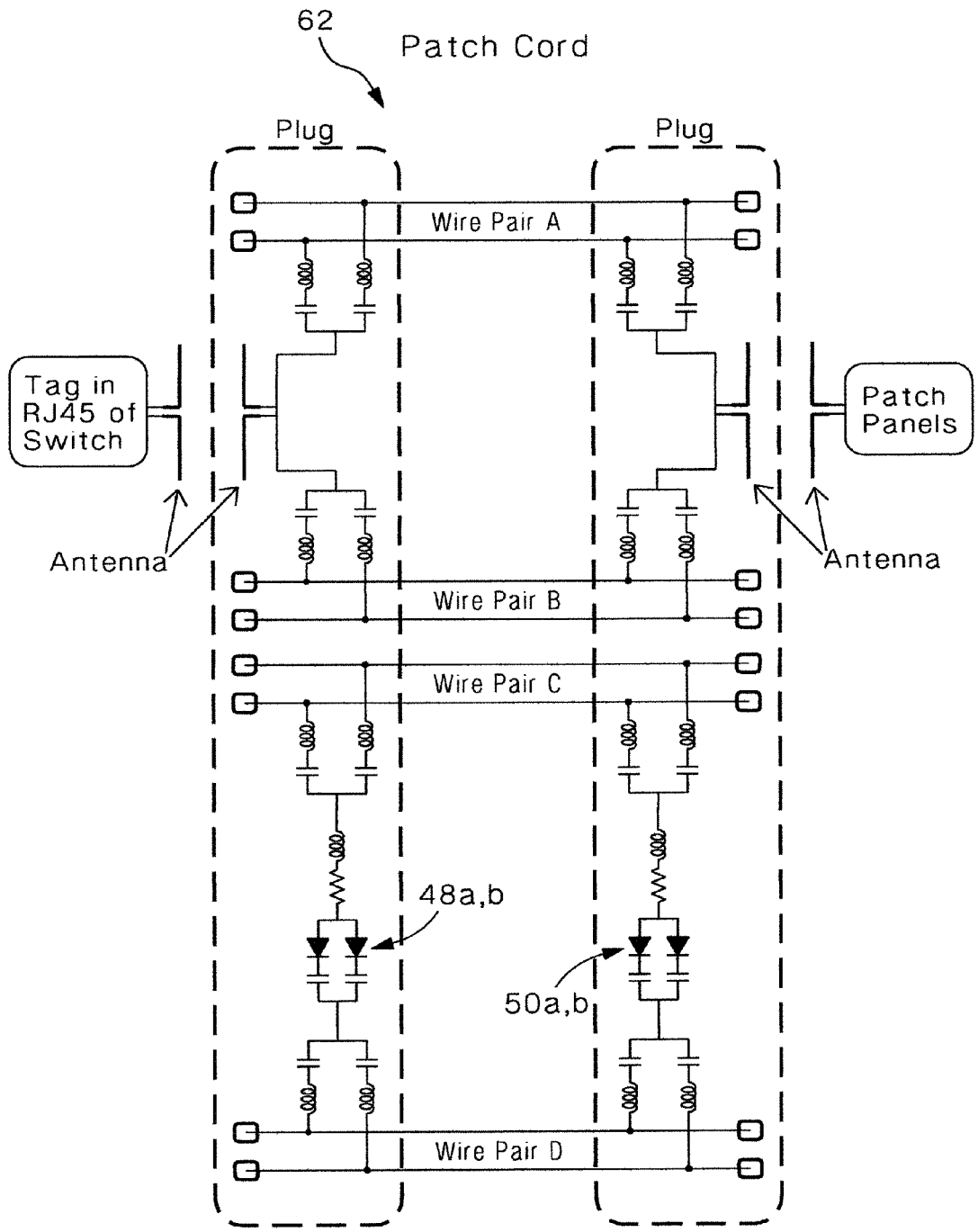
FIG. 5 is a schematic diagram of a patch cord according to another embodiment of the invention.

FIGS. 4 and 5 show alternative embodiments of patch cords 60 and 62 that make use of common-mode signaling over the standard four wire pairs in copper-based Ethernet systems to provide communication between RFID readers and RFID tags, as well as to provide signaling to illuminate LEDs. In the patch cord 60 of FIG. 4, two wire pairs are used to transmit both RFID signals and LED illumination signals, in addition to the standard Ethernet communication signaling. In the patch cord 62 of FIG. 5, two wire pairs are used to transmit RFID signals, and two other pairs are used to transmit LED illumination signals. In the embodiment of FIG. 5, LED signaling connections (not shown) are provided between the contacts associated with pairs C and D of the patch cord 62 and the port contacts at the patch panel, so that the patch panel can provide signals and power to illuminate the LEDs 48a,b and 50a,b provided in the plugs of the patch cord 62.

Figure 7:
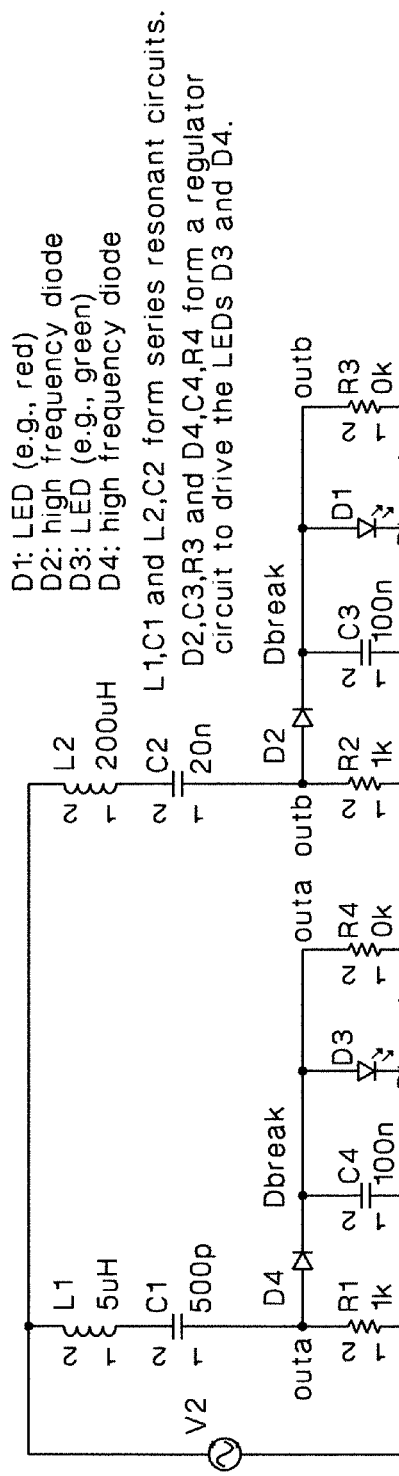
FIG. 7 shows the results of a time domain simulation of LED drive circuitry.
Figure 7:
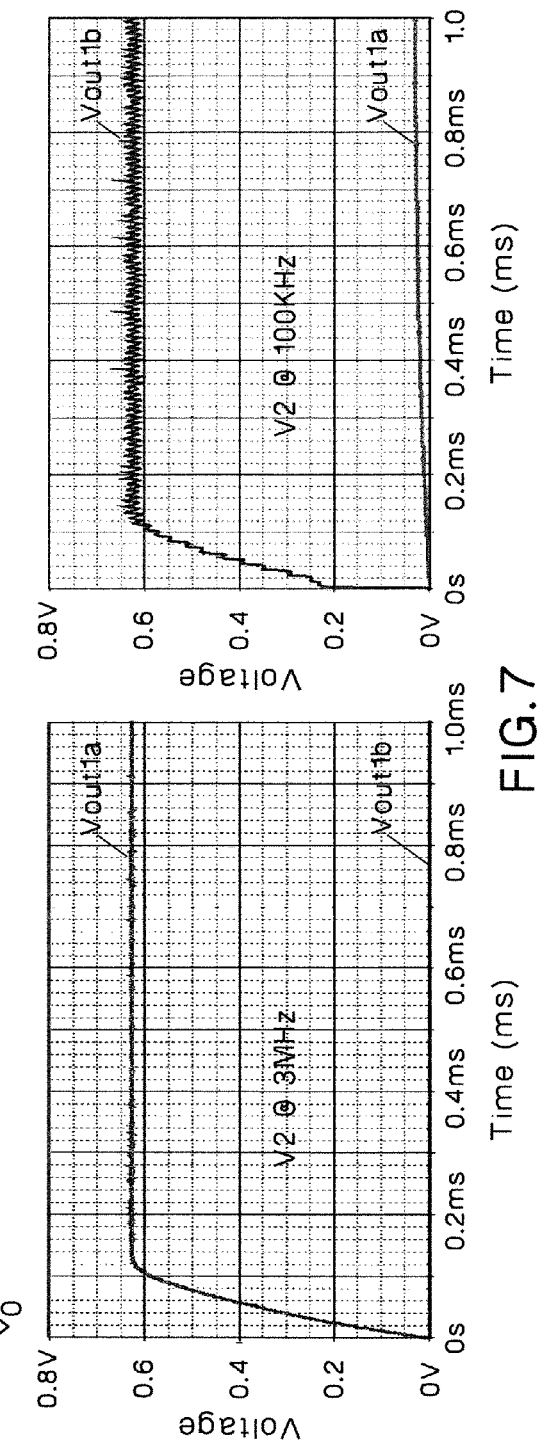

FIGS. 6 and 7 show the results of simulations of series resonant LC circuits with their respective drive circuits. FIG. 6 shows the results of a frequency-domain simulation of two series resonant LC circuits. This simulation indicates that two LEDs can be independently controlled by providing control signals at different frequencies. FIG. 7 shows the results of a time-domain simulation of two resonant circuits for use in driving LEDs, and further indicates that the LEDs can be properly independently controlled.

What is claimed is:

1. A patch cord for a physical layer management system, comprising:
    a communication cable including a first end, a second end, and plurality of signal pairs extending between said first end and said second end;
    a first plug connected to said first end and a second plug connected to said second end, at least one plug having a plug antenna and at least one LED circuit, each LED circuit having at least one circuit containing at least one light emitting diode (LED) and having at least one resonant frequency.

2. The patch cord of claim 1, wherein said at least one LED circuit includes a first circuit with a first said LED and a first said resonant frequency, and a second circuit with a second said LED and a second said resonant frequency.

3. The patch cord of claim 2, wherein said first resonant frequency is different than said second resonant frequency.

4. The patch cord of claim 1, wherein said plurality of signal pairs includes a plurality of Ethernet signal pairs with a first Ethernet signal pair and a second Ethernet signal pair, said at least one LED circuit is connected between said first Ethernet signal pair and said second Ethernet signal pair.

5. The patch cord of claim 1, wherein said plurality of signal pairs includes a plurality of Ethernet signal pairs, and an out of band signal pair with a first out of band conductor and a second out of band conductor, said at least one LED circuit is connected between said first out of band conductor and said second out of band conductor.

* * * * *